United States Patent
Onnen et al.

(10) Patent No.: US 6,424,054 B1
(45) Date of Patent: Jul. 23, 2002

(54) VEHICLE STEERING MODE SELECTION CONTROL

(75) Inventors: Marlin Martin Onnen, Crystal Lake, IL (US); Ralph Edwin Shirley, Waterloo; David Allen Larson, Cedar Falls, both of IA (US); Mark Desmond Fallon, Hamburg (DE)

(73) Assignee: Deere & Company, Moline, IL (US)

( * ) Notice: Subject to any disclaimer, the term of this patent is extended or adjusted under 35 U.S.C. 154(b) by 96 days.

(21) Appl. No.: 09/609,659

(22) Filed: Jun. 30, 2000

(51) Int. Cl.7 .................................................. B60L 1/00
(52) U.S. Cl. ....................................................... 307/9.1
(58) Field of Search ........................... 307/9.1; 180/414, 180/413; 701/50, 41; 340/815.4

(56) References Cited

U.S. PATENT DOCUMENTS

| | | | | |
|---|---|---|---|---|
| 2,981,808 A | * | 4/1961 | Klein | 200/38 A |
| 3,750,834 A | * | 8/1973 | Luft | 180/414 |
| 4,037,490 A | | 7/1977 | Wilson | 74/553 |
| 4,090,581 A | * | 5/1978 | Miner et al. | 180/414 |
| 4,893,689 A | * | 1/1990 | Laurich-Trost | 180/414 |
| 5,076,382 A | * | 12/1991 | Vaugh et al. | 180/413 |
| 5,212,642 A | * | 5/1993 | Tanaka et al. | 701/41 |
| 5,492,353 A | * | 2/1996 | Chapman | 280/47.1 |
| 5,494,397 A | | 2/1996 | Wilson | 414/728 |
| 5,526,891 A | | 6/1996 | Goloff | 180/415 |
| 5,533,584 A | | 7/1996 | Johnson | 180/415 |
| 5,684,699 A | * | 11/1997 | Sugiyama | 701/41 |
| 5,752,578 A | | 5/1998 | Kellogg | 180/414 |
| 6,128,563 A | * | 10/2000 | Muraro | 701/50 |

FOREIGN PATENT DOCUMENTS

JP    11-107327 A    *    4/1999

OTHER PUBLICATIONS

English translaton of Abstract of JP11107327A, published Apr. 20, 1999.*
Ford New Holland, "LM 430 Telehandler", 1999, 4 pages. No month.

* cited by examiner

*Primary Examiner*—Kim Huynh
*Assistant Examiner*—Sharon Polk

(57) ABSTRACT

A vehicle steering mode selection control system includes an operator controlled push-to-turn switch steering mode select device, and a control circuit operatively connected to the mode select device, to steering mode actuators, to steering mode indicators and to wheel alignment indicators. The control circuit includes a timer which is actuated for a certain time period in response to pushing of the push-to-turn switch. A lamp control module is connected to the timer and permits illumination of the wheel alignment indicator lamps only during this time period. A relay is connected between the push-to-turn switch and the timer to prevent the lamp control module from responding during the time period to further pushing of the steering mode select device.

13 Claims, 3 Drawing Sheets though the straight ahead position. This illumination of the lamps is potentially distracting to the operator and does not provide any advantages during normal machine operation.

VEHICLE STEERING MODE SELECTION CONTROL

BACKGROUND OF THE INVENTION

The invention relates to a mode selection control, and more particularly, to a vehicle steering mode selection control.

Various types of vehicles, including telescopic handler vehicles, or "telehandlers", have four wheel drive, four wheel Ackermann type steering and multiple steering modes. These steering modes can include a 4-wheel steering mode for tight situations (wherein the front wheels steer opposite to the rear wheels), a 2-wheel steering mode for road travel (wherein only the front wheels are steered), and a 4-wheel crab steer mode (wherein the front and rear wheels turn in the same direction) so that the vehicle moves in a different direction, but its orientation does not change.

Various apparatus and means for switching between these different steering modes are known. For example, it is known to use a solenoid operated three position valve to control fluid communication from a steering valve to the front and/or rear axle steering actuators. It is also known to use electrical switches to control the operation of the three position valve, and with such a system the operator may choose to look at the position of the wheels and switch between steering modes when the wheels are judged to be in a straight orientation. Some known production vehicles include a steering position sensor and illuminate a lamp on the operator console to provide the operator with information as to whether or not the wheels are straight. It is know to use sensors on both axles and two lamps, one for each axle.

It is also known to use various types of switches or control devices to switch between modes, the most common being a rocker or rotary switch. It is also known to use a separate switch to disable the indicator lamps when not in the process of switching between steering modes. Also known are automated systems which permit pre-selection of the desired steering mode, but wherein the steering mode is not actually changed until the wheels are steered to the center. With such automated systems, the operator is not provided with an indication of the position of the wheels.

There are certain problems associated with these known designs. For example, the steering mode can be accidentally or inadvertently changed by incidental contact with the switch. This could result in an undesired movement of the vehicle. Also, in the systems with the indicator lamps, the lamps are illuminated each time the wheels are steered through the straight ahead position. This illumination of the lamps is potentially distracting to the operator and does not provide any advantages during normal machine operation.

SUMMARY OF THE INVENTION

Accordingly, an object of this invention is to provide a vehicle steering mode selection control which prevents accidental or inadvertent changing of the steering mode.

A further object of the invention is to provide such a vehicle steering mode selection control which prevents unnecessary illumination of indicator lights.

These and other objects are achieved by the present invention, wherein a vehicle steering mode selection control includes a dual motion (push to turn) rotary switch which cooperates with a timer circuit, a lamp control unit, wheel alignment sensors, wheel alignment lamps, and a "system on" lamp. To change modes, the operator pushes the switch so that it can be turned to select a different steering mode. Pushing the switch starts the timer, activates the wheel alignment sensors, activates or energizes the lamp control unit for a limited time period and illuminates the "system on" lamp, indicating that the wheel alignment sensors and the lamp control unit are ready for use by the operator. When the wheels are steered to the centered or straight ahead position, the wheel alignment sensors and the lamp control unit cooperate to illuminate the corresponding wheel alignment lamps so that the operator can rotate the switch to change steering modes knowing that the wheels associated with the illuminated lamp are aligned straight. The timer provides a limited, pre-determined length of time for making the steering mode change with the assistance of the wheel alignment lamps. When the timer times out, all the wheel alignment lamps are kept off, but the operator can still change steering modes without the assistance of the wheel alignment lamps. If the operator chooses to push the switch and then immediately turn it to change the steering mode (without checking the status of the lamps), the system will immediately respond and change the steering mode as commanded. If timer times out before the switch is turned, the sensors and lamp control unit are de-activated, but the operator can still change steering modes without the assistance of the wheel alignment lamps.

DETAILED DESCRIPTION

Figure 1:
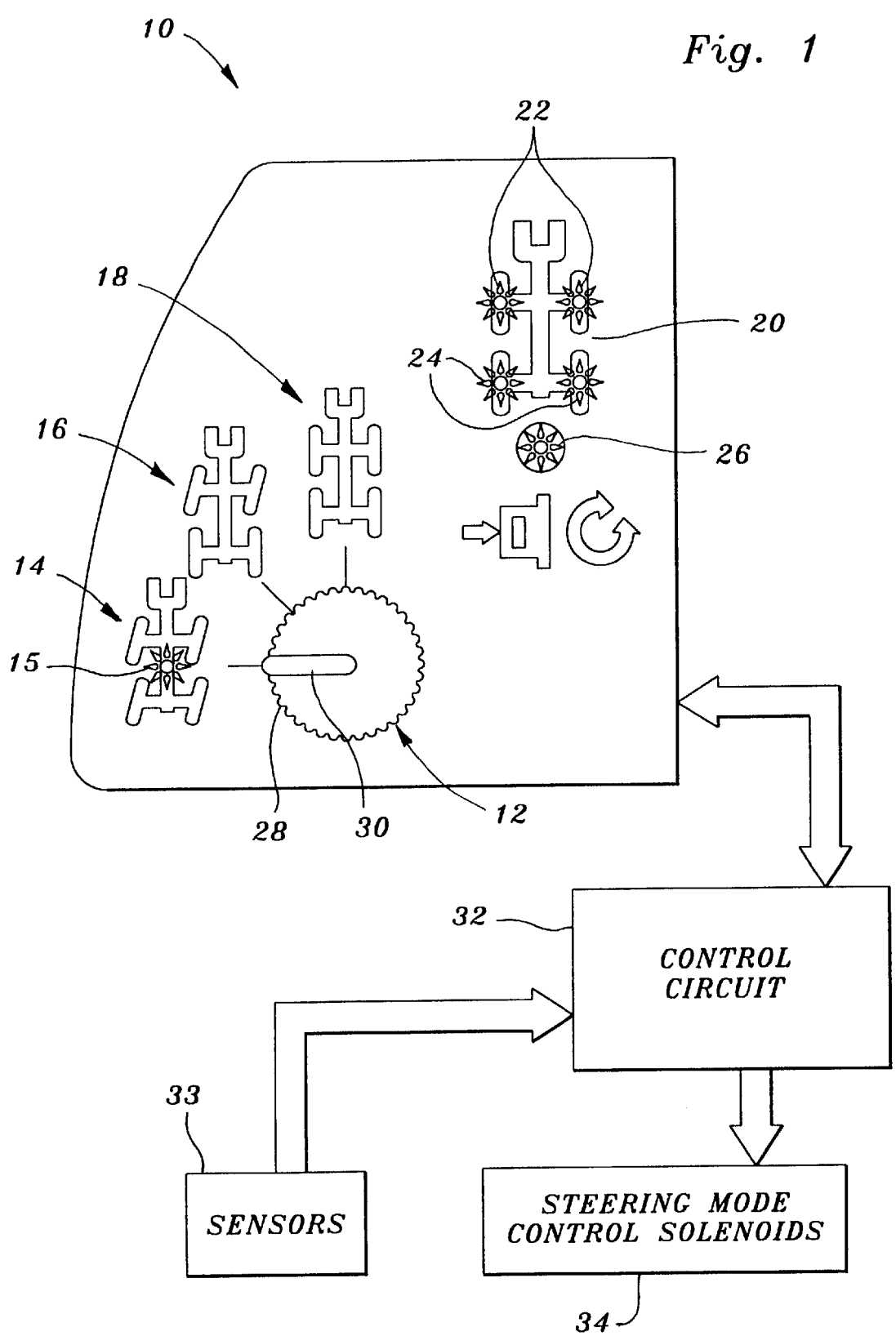
FIG. 1 is a view of a portion of an operator's control panel showing a steering mode select switch and indicator displays according to the present invention.

FIG. 1 shows a portion of a vehicle control panel 10 for a vehicle (not shown) having wheels (not shown) and a steering system (not shown) which is capable of steering the vehicle in a plurality of steering modes. Panel 10 includes a steering mode select switch 12. Switch 12 is preferably a dual motion switch, such as a commercially available push-to-turn switch. The portion of panel 10 includes a crab steer symbol 14, a 2 wheel steer symbol 16 and a 4 wheel steer symbol 18. Panel 10 also includes a wheel or axle alignment symbol 20 with openings behind which are mounted indicator lamps or LEDs, including a pair of front wheel alignment lamps 22, a pair of rear wheel alignment lamps 24 and an alignment "system on" lamp 26 (preferably green). The switch 12 has a knob 28 with an alignment mark 30 which will point to one of the symbols 14–18 as it is rotated to actuate the corresponding steering mode. The switch 12 and the lamps 22–26 are connected to a control circuit 32, which is connected to wheel alignment sensors 33 and to steering mode control solenoids 34. The crab steer symbol 14 is preferably illuminated by a lamp or LED 15.

Figure 2:
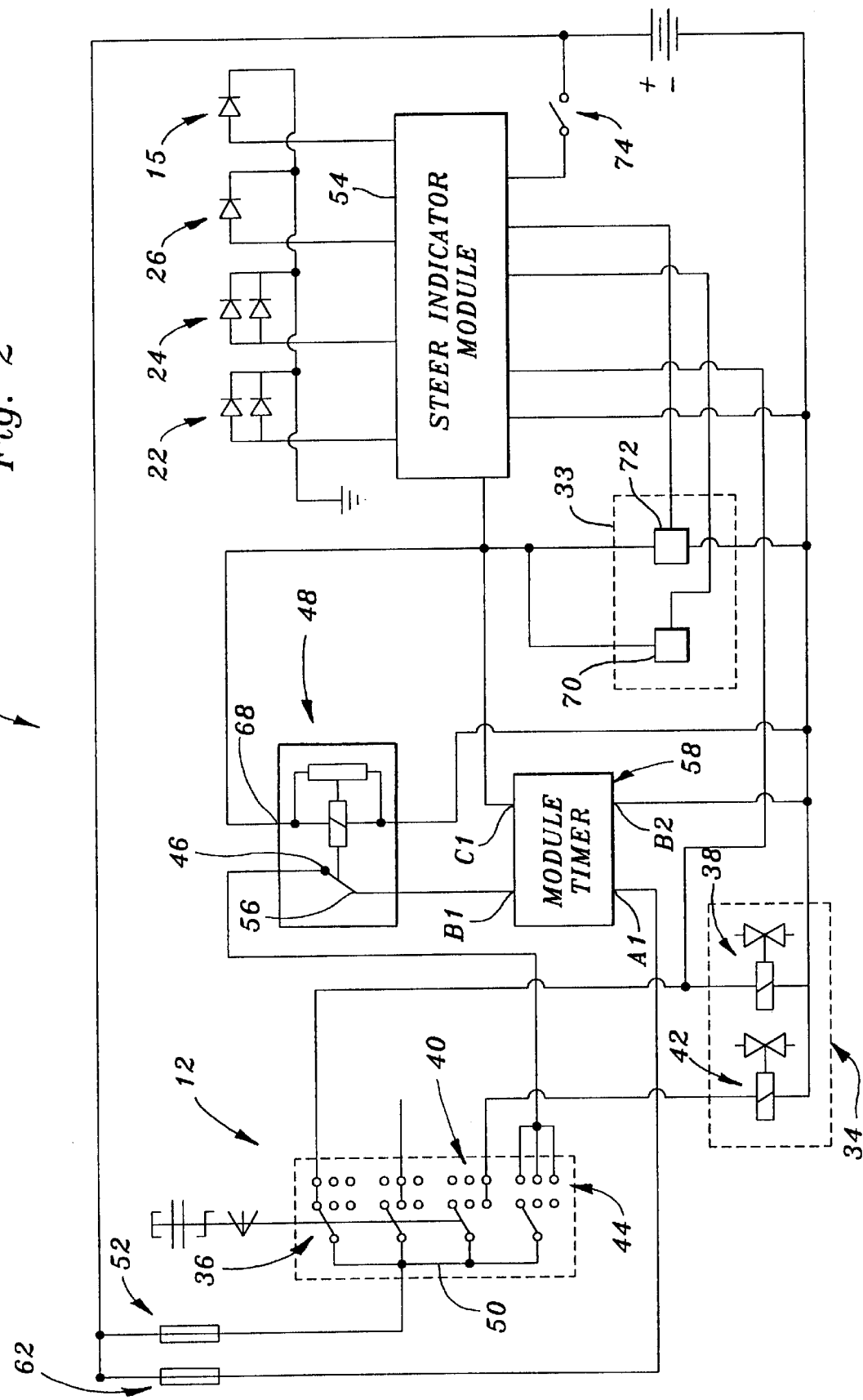
FIG. 2 is an electrical schematic diagram of the steering mode and indicator light control circuit of FIG. 1.

Referring now to FIG. 2, the switch 12 includes a first set of contacts 36 connected to a crab steer solenoid 38, a second, unused set of contacts, a third set of contacts 40 connected to a 4 wheel steer solenoid 42, and a fourth set of contacts 44 connected to a terminal 46 of an axle lamp relay 48. The switch element 50 of switch 12 is connected to +12 volts via fuse 52. The first set of contacts 36 are also connected to steer indicator module 54.

Relay 48 also includes a terminal 56 connected to a terminal B1 of module timer unit 58. Timer unit 58 includes a terminal A1 connected to +12 volts via fuse 62, a terminal C1 connected to steer indicator or lamp control module 54 and to a front axle or wheel alignment sensor 70 and a rear axle or wheel alignment sensor 72, and a terminal B2 connected to ground. Timer 58 operates to connect terminal A1 to C1 for 90 seconds (thus applying +12 volts to the lamp control module 54 and to the sensors 70 and 72) when +12 volts is applied to terminal B1. Relay 48 also includes a terminal 68 connected to timer terminal C1. Sensors 70 and 72 are also connected to ground and to the lamp control module 54. Sensors 70 and 72 are preferably steering cylinder (not shown) position sensors, such as commercially available magnetic sensors which generate a signal when the steering cylinder, or wheels (not shown) is centered, which are commercially available from Ognibene SPA, or the equivalent. The lamp control module 54 is connected to lamps 15 and 22–26, and to +12 volts via headlight switch 74.

Figure 3:
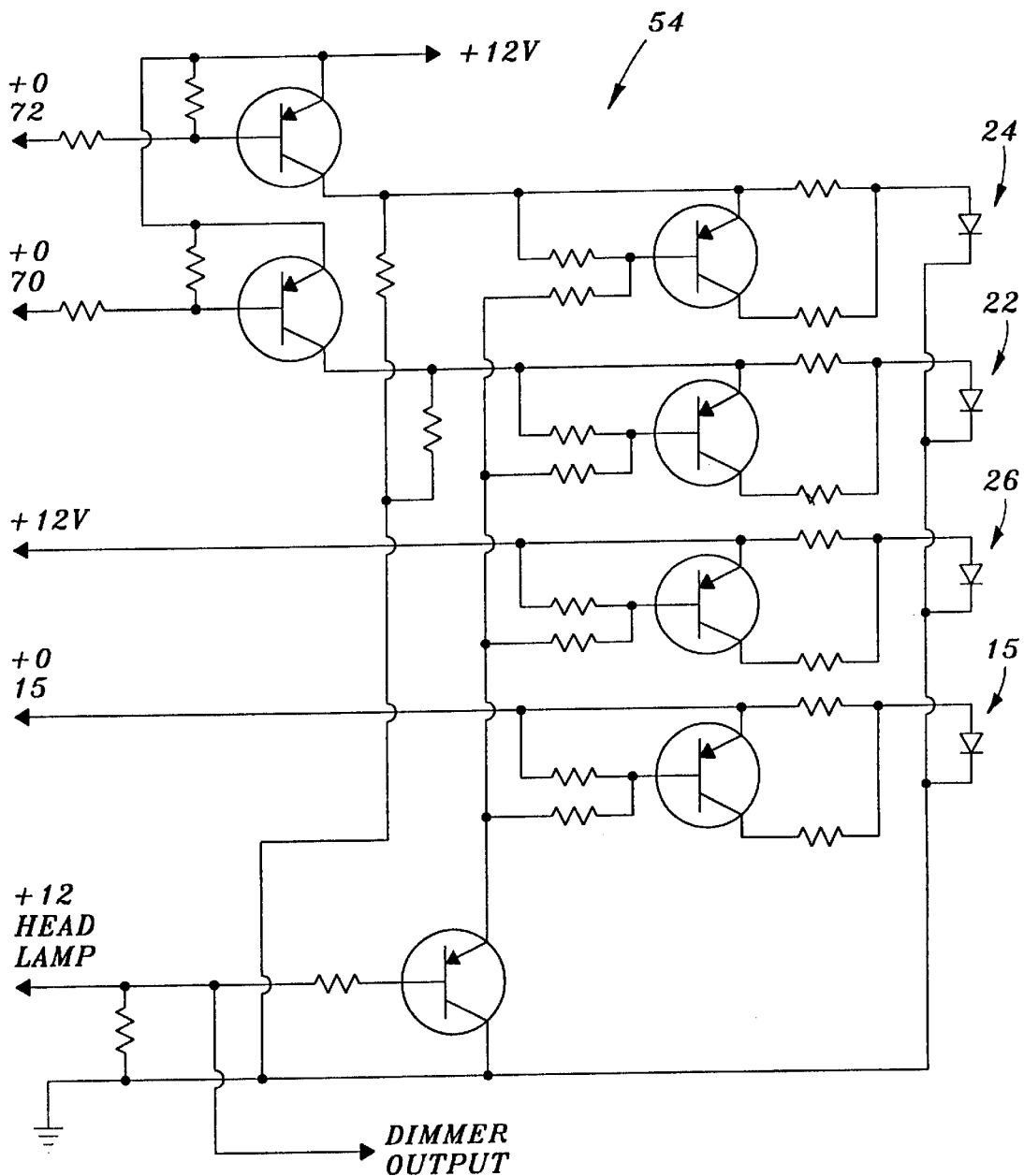
FIG. 3 is an electrical schematic diagram of the steer indicator module of FIG. 2.

Referring to FIG. 3, the lamp control module 54 includes an array of driving transistors connected as shown between, on one hand, sensors 70 and 72, +12 volts, crab steer solenoid 38, a +12 volt dimmer control (not shown) and ground, and on the other hand, front wheel alignment lamps 22, rear wheel alignment lamps 24, system "ON" lamp 26 and crab steer lamp 15.

The above described system actuates the steering mode selected by the switch 12, and additionally controls the lamps 15 and 22–26. Before switch 12 can be turned, it must first be pushed in, and this acts as a reminder to the operator in case the operator desires to coordinate the steering mode change with alignment of the wheels (not shown). Pushing the switch 12 causes the timer 58 to energize the lamp control module 54 for a time period, such as 90 seconds, and turns on lamp 26, which indicates to the operator that the lamp control module 54 is "on" and that the indicator lamps 22–24 can be used in connection with changing the steering mode. When the front or rear wheels (not shown) are centered, a signal from the corresponding wheel alignment sensor 70 and/or 72 causes the illumination of the corresponding front/rear wheel alignment lamp 22 and/or 24 on the panel 10. These lamps serve as a convenient guide signaling to the operator when it is desirable to change modes. When the timer 58 times out after 90 seconds, the lamps 22–26 are extinguished. However, the system will change steering modes in response to rotation of knob 28 after the timer 58 times out.

Preferably, the steering mode switch 12 is a commercially available three position, push-to-turn, rotary switch with momentary contacts 44 activated by the "push" function. The switch 12 cannot be turned without the closing of the momentary contacts 44. When switch 12 is in a first position with mark 30 pointing to crab steer symbol 14, the control circuit 32 applies current to the crab steer solenoid 38, which places the vehicle (not shown) in a crab steering mode. When switch 12 is in a second position with mark 30 pointing to 2 wheel steer symbol 16, the switch output is 0V and the control circuit 32 de-energizes solenoids 38 and 42, which places the vehicle (not shown) in a 2 wheel steering mode. When switch 12 is in a third position with mark 30 pointing to 4 wheel steer symbol 18, the control circuit 32 applies current to the 4 wheel steer solenoid 42, which places the vehicle (not shown) in a 4 wheel steering mode.

More specifically, when the steering mode switch 12 is pushed it activates an "alignment mode". This engages the momentary contacts 44 and voltage is applied through relay 48 to the timer 58, which energizes and starts the timer 58. The timer 58 will remain energized for the certain time period, and during this time period the output of timer 58 will be +12 volts, and +12 volts will be applied to the steering indicator module 54. The energizing of the timer 58 also energizes relay 48, which causes relay 48 to open and thereby preventing the system from responding to further "pushes" of switch 12. The timer 58 also energizes and activates front wheel alignment sensor 70 and rear wheel alignment sensor 72. Lamp 26 is turned on to indicate that the lamp control module 54 is energized and activated. When the front or rear wheels are centered, the output of corresponding sensor 70,72 goes "low" and module 54 turns on the corresponding lamps 22,24 on the display panel 10. A conventional dimmer control (not shown) may be used to dim the lamps 22–26 during the night.

If timer 58 times out (the certain time period expires) before knob 28 is turned, the module 54 is de-activated and the lamps 22–26 will not turn on, even when the front or rear wheels are centered.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

What is claimed is:

1. A steering mode selection control system for a vehicle having a plurality of steering modes activated by steering mode actuators, the control system having an operator controlled steering mode select device connected to the steering mode actuators, and a control circuit operatively connected to the mode select device and to a wheel alignment indicator, wherein:

the steering mode select device comprises a dual motion device which must be moved in a first manner before it can be moved in a second manner to change a steering mode of the vehicle; and the control circuit comprises a timer connected to the steering mode select device and an indicator control unit connected to the timer and to the indicator, the timer being actuated for a certain time period in response to movement of the steering, mode select device in said first manner, the timer cooperating with the indicator control unit to permit activation of the wheel alignment indicator only during said time period.

2. The vehicle steering mode selection control system of claim 1, wherein:

the steering mode select device comprises a push-to-turn rotary switch.

3. The vehicle steering mode selection control system of claim 1, wherein:

a relay is connected between the steering mode select device and the timer to prevent the timer from responding during said time period to further movements of the steering mode select device in said first manner.

4. The vehicle steering mode selection control system of claim 1, wherein:

a system "ON" indicator is connected to the indicator control unit, the indicator control unit and the timer cooperating to energize "ON" indicator during said time period in response to the steering mode select device being moved in said first manner.

5. A steering mode selection control system for a vehicle having a plurality of steering modes activated by steering mode actuators, the control system having an operator controlled steering mode select device connected to the steering mode actuators, and a control circuit operatively connected to the mode select device and to a wheel alignment indicator, wherein:

the steering mode select device comprises a push-to-turn rotary switch which must be pushed before it can be rotated to change a steering mode of the vehicle; and the control circuit comprises a timer and an indicator control unit, the timer being actuated for a certain time period in response to movement of the steering mode select device in said first manner, the timer cooperating with the indicator control unit to permit activation of the wheel alignment indicator only during said time period.

6. The vehicle steering mode selection control system of claim 5 wherein:

a relay is connected between the steering mode select device and the timer to prevent the timer from responding during said time period to further movements of the steering mode select device in said first manner.

7. The vehicle steering mode selection control system of claim 5 wherein:

a system "ON" indicator is connected to the indicator control unit, the indicator control unit and the timer cooperating to energize "ON" indicator during said time period in response to the switch being pushed.

8. A steering mode selection control system for a vehicle having a plurality of steering modes, the control system comprising:

an operator controlled push-to-turn rotary switch, steering mode actuators operable to change a steering mode of the vehicle in response to rotation of the switch;

wheel alignment indicators operable to indicate an alignment status of wheels of the vehicle; and a control circuit operatively connected to the switch and to the wheel alignment indicators, the control circuit comprises a timer unit and a indicator control unit, the timer unit energizing the indicator control unit for a certain time period in response to a pushing movement of the switch, the timer unit and the indicator control unit cooperating to permit activation of the wheel alignment indicator only during said time period.

9. The vehicle steering mode selection control system of claim 8, wherein:

a relay is connected between the switch and the timer unit, the relay preventing the timer unit from responding during said time period to further pushing of the switch.

10. The vehicle steering mode selection control system of claim 8, wherein:

a system "ON" indicator is connected to the indicator control unit, the "ON" indicator being energized during said time period in response to the switch being pushed.

11. A steering mode selection control system for a vehicle having a plurality of steering modes, the control system comprising:

an operator controlled steering mode select device comprising a dual motion device which must be moved in a first manner before it can be moved in a second manner;

steering mode actuators connected to the steering mode select device and operable to change a steering mode of the vehicle in response to movement of the steering mode select device in said second manner;

wheel alignment indicators operable to indicate an alignment status of wheels of the vehicle; and a control circuit operatively connected to the steering mode select device and to the wheel alignment indicators, the control circuit comprises a timer unit and a indicator control unit, the timer unit energizing the indicator control unit for a certain time period in response to movement of the steering mode select device in said first manner, the timer unit and the indicator control unit cooperating to permit activation of the wheel alignment indicator only during said time period.

12. The vehicle steering mode selection control system of claim 11, wherein:

a relay is connected between the steering mode select device and the timer unit, the relay preventing the timer unit from responding during said time period to further movements of the steering mode select device in said first manner.

13. The vehicle steering mode selection control system of claim 11, wherein:

a system "ON" indicator is connected to the indicator control unit, the "ON" indicator being energized during said time period.

* * * * *